United States Patent
Izumisawa et al.

(10) Patent No.: US 7,328,444 B2
(45) Date of Patent: Feb. 5, 2008

(54) SHAFT SUPPORT MECHANISM OF OPTICAL DISK DRIVE AND SKEW ADJUSTMENT MECHANISM OF OPTICAL DISK DRIVE

(75) Inventors: Masaomi Izumisawa, Yokohama (JP); Naoki Eguchi, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 384 days.

(21) Appl. No.: 11/116,302

(22) Filed: Apr. 28, 2005

(65) Prior Publication Data

US 2006/0107276 A1    May 18, 2006

(30) Foreign Application Priority Data

Nov. 18, 2004    (JP)    ............. 2004-334410

(51) Int. Cl.
G11B 7/08    (2006.01)
G01B 21/02    (2006.01)
(52) U.S. Cl. ............. 720/675; 369/249.1; 369/247.1; 369/219.1
(58) Field of Classification Search ............. 369/219.1, 369/247.1, 249.1; 720/675
See application file for complete search history.

(56) References Cited

U.S. PATENT DOCUMENTS 6,922,314 B2 *   7/2005   Maeda ............. 360/267.2
7,152,234 B2 * 12/2006   Kabasawa ............. 720/606
7,219,357 B2 *   5/2007   Furuya et al. ............. 720/675
2005/0262525 A1 * 11/2005   Nasu ............. 720/675
2006/0080691 A1 *   4/2006   Chiu et al. ............. 720/676
2006/0236330 A1 * 10/2006   Hayashi et al. ............. 720/675
2007/0101348 A1 *   5/2007   Chang ............. 720/673

FOREIGN PATENT DOCUMENTS

| JP | 10255272 A | * | 9/1998 |
|---|---|---|---|
| JP | 11306547 A | * | 11/1999 |
| JP | 2001307436 A | * | 11/2001 |
| JP | 2002260349 A | * | 9/2002 |
| JP | 2003-059065 | | 2/2003 |
| JP | 2004039099 A | * | 2/2004 |
| JP | 2004288324 A | * | 10/2004 |

* cited by examiner

Primary Examiner—William J Klimowicz
(74) Attorney, Agent, or Firm—Oblon, Spivak, McClelland, Maier & Neustadt, P.C.

(57) ABSTRACT

A skew adjustment mechanism of an optical disk drive includes: a pair of rod-shaped guide shafts 32a and 32b that hold an optical pick-up unit 31 therebetween and guide the optical pick-up unit; four fixing members each having a pair of claw portions 44b1 and 44b2 that are provided at a predetermined interval; four extension springs 37a, 37b, 37c and 37d each having ring-shaped hook portions at both leading ends thereof, the hook portions are hooked over the claw portions where the extension spring surrounds the shaft, thereby pressing the end portions of the shaft against the fixing member; four adjustment mechanisms that move the guide shafts 32a and 32b against the fixing member so as to allow the end portion of the guide shafts to be away from the fixing member in order to tilt the optical pick-up unit 31 in accordance with the tilt of the optical disk.

3 Claims, 5 Drawing Sheets

PRIOR ART

PRIOR ART

SHAFT SUPPORT MECHANISM OF OPTICAL DISK DRIVE AND SKEW ADJUSTMENT MECHANISM OF OPTICAL DISK DRIVE

CROSS-REFERENCE TO RELATED APPLICATION

This application claims priority of Japanese Patent Application No. 2004-334410, filed on Nov. 18, 2004, the entirety of which is incorporated by reference herein.

BACKGROUND OF THE INVENTION

1. Field of the Invention

The present invention relates to a shaft support mechanism used in a skew adjustment mechanism of an optical pick-up unit of an optical disk drive that irradiates the surface of an optical disk such as CD or DVD with a laser beam to perform recording/reproduction.

2. Description of the Related Art

In the operation of irradiating an optical disk such as CD or DVD with a laser beam to read data on the optical disk, if the disk surface is tilted relative to the laser light, signals from the optical disk cannot accurately be reproduced in some cases. To cope with the above problem, there has been employed a skew correction mechanism that tilts an optical pick-up unit relative to the optical disk to perform skew correction. More specifically, the skew correction mechanism supports the optical pick-up unit by a pair of guide shafts and tilts the guide shafts in accordance with the tilt of the optical disk to thereby tilt the optical pick-up unit.

Various types of springs are used to support the guide shafts. For example, in a technique disclosed in Jpn. Pat. Appln. Laid-Open Publication No. 10-255272 (Patent Document 1), a round rod is moved forward or backward to tilt the guide shafts to tilt an optical pick-up unit supported by the guide shaft. In this case, an extension spring is used to force the guide shafts against the round rod.

FIG. 1 shows an example of the optical pick-up unit support mechanism of the optical disk reproduction apparatus, in which a plate spring 12 is used to hold down a guide shaft 11, the plate spring 12 being secured by screwing down a fixing screw 13 on the upper surface. Further, a retainer 14 is provided to prevent the guide shaft 11 being off to the side.

In an example of FIG. 2, a torsion spring 22 is used to hold down a guide shaft 21. A base portion 23 of the torsion spring 22 is secured by a fixture 24 and one end thereof is secured by a stopper 25. Also in this case, a retainer 26 is used to prevent the guide shaft 21 from being off to the side.

However, in the mechanism disclosed in the Patent Document 1, one end of the extension spring needs to be hooked over the guide shaft and the other end needs to be secured to a base plate. This complicates the mechanism to increase manufacturing cost.

Further, the fixing screw 13 and retainer 14 must be provided in the mechanism shown in FIG. 1, and fixture 24 and retainer 26 are indispensable in the mechanism shown in FIG. 2. Thus, the mechanism becomes complicated, leading to increase in manufacturing cost.

BRIEF SUMMARY OF THE INVENTION

An object of the present invention is to provide a shaft support mechanism having a simple structure and capable of being manufactured at low cost.

According to an aspect of the present invention, there is provided a shaft support mechanism of an optical disk drive comprising: a rod-shaped shaft; a fixing member having a pair of claw portions that are provided at a predetermined interval; an extension spring having hook portions at both leading ends thereof, the hook portions are hooked over the claw portions in a state where the extension spring surrounds the shaft, thereby pressing the shaft against the fixing member; and an adjustment mechanism that moves the end portion of the shaft against the fixing member so as to allow the end portion of the shaft to be away from the fixing member.

DETAILED DESCRIPTION OF THE INVENTION

Figure 1:
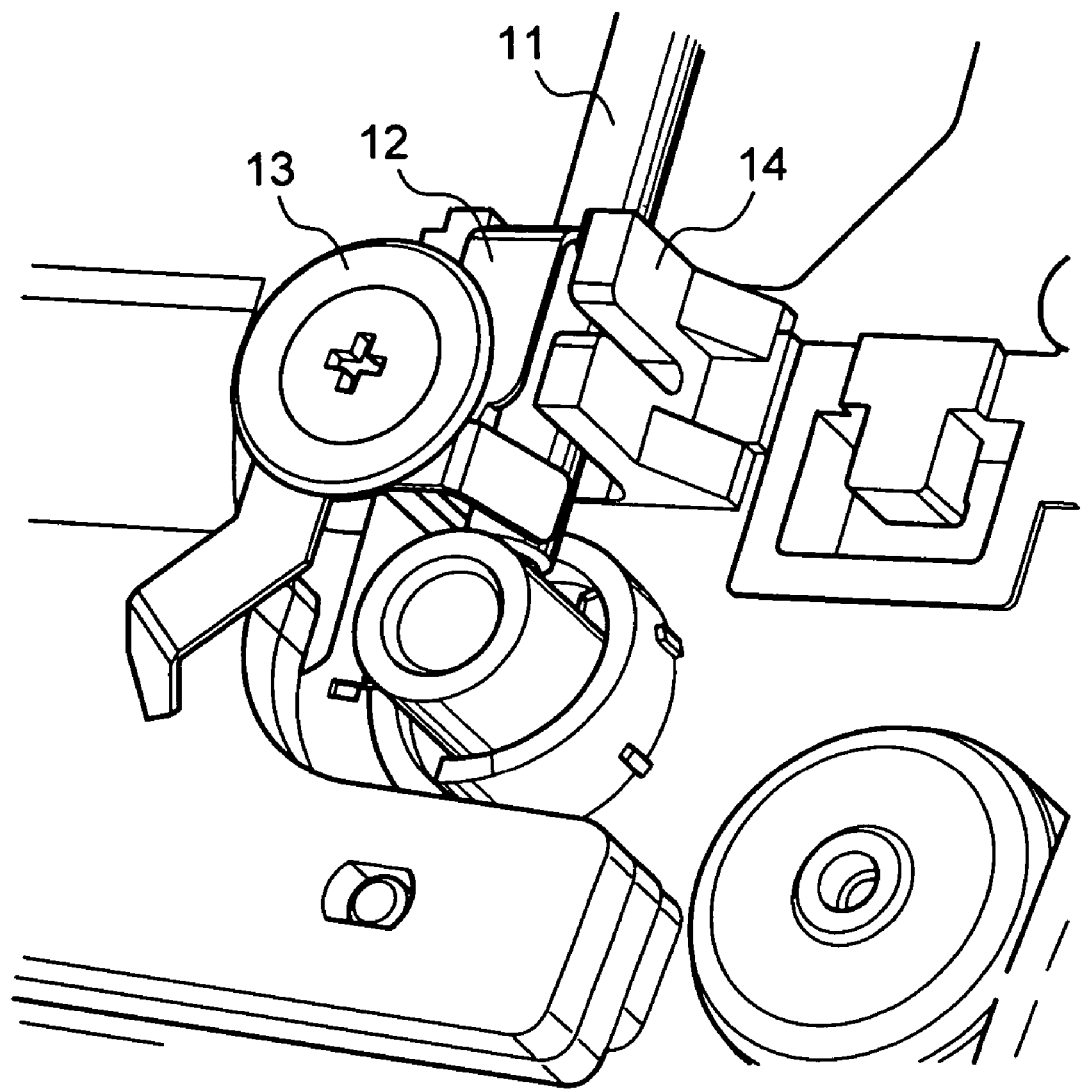
FIG. 1 is a view showing an example of the conventional skew adjustment mechanism of an optical pick-up unit of an optical disk drive.
Figure 2:
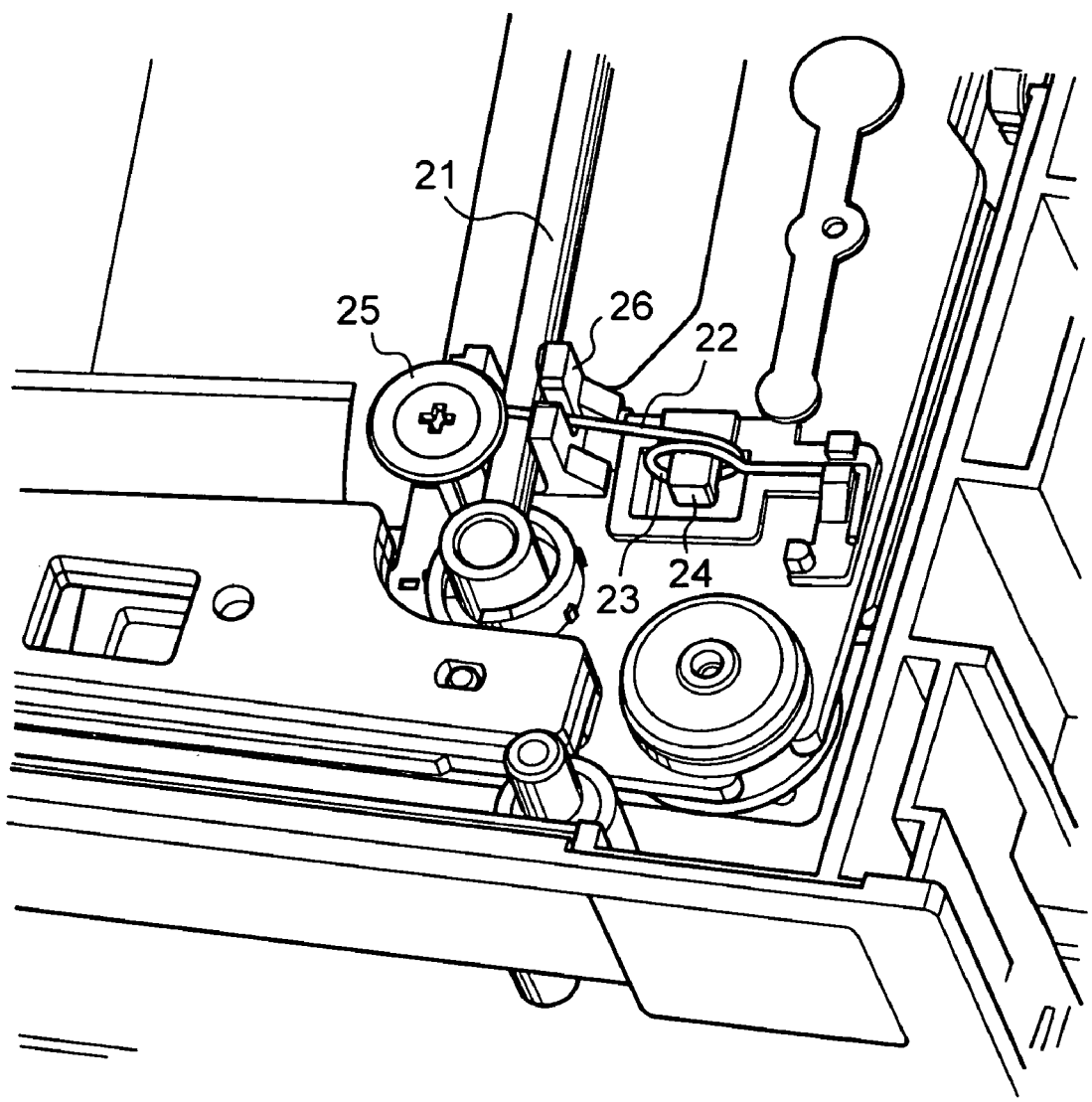
FIG. 2 is a view showing another example of the conventional skew adjustment mechanism of an optical pick-up unit.
Figure 3:
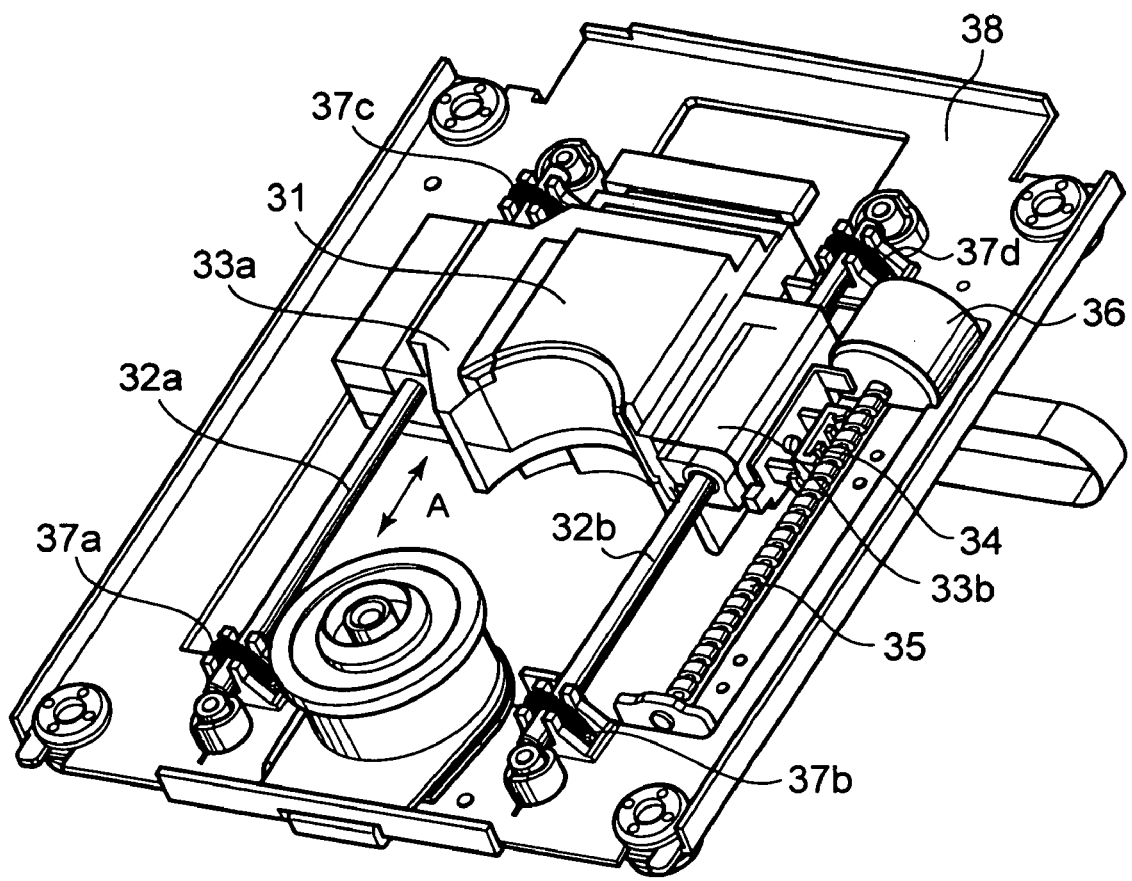
FIG. 3 is a perspective view of an embodiment in which the present invention is applied to the skew adjustment mechanism of an optical pick-up unit of an optical disk drive.

An embodiment of the present invention will be described below with reference to the accompanying drawings. FIG. 3 is a perspective view of the embodiment in which the present invention is applied to the skew adjustment mechanism of an optical pick-up unit of an optical disk drive.

In FIG. 3, reference numeral 31 denotes an optical pick-up unit. Although not shown, the optical pick-up unit 31 incorporates a lens and laser diode. The optical pick-up unit 31 is held between two round rod-shaped guide shafts 32a and 32b disposed parallel to each other and supported by support portions 33a and 33b. The support portion 33b has a projecting portion 34, which is engaged with a spiral groove running around a screw rod 35 disposed near the projecting portion 34. The screw rod 35 is rotated by a motor 36. The rotation of the screw rod 35 moves the optical pick-up unit 31 in the direction parallel to the guide shafts 32a and 32b, that is, in the direction indicated by the arrow A.

End portions of the guide shafts 32a and 32b are secured to a pick-up traverse chassis 38 by extension springs 37a, 37b, 37c, and 37d.

Figure 4:
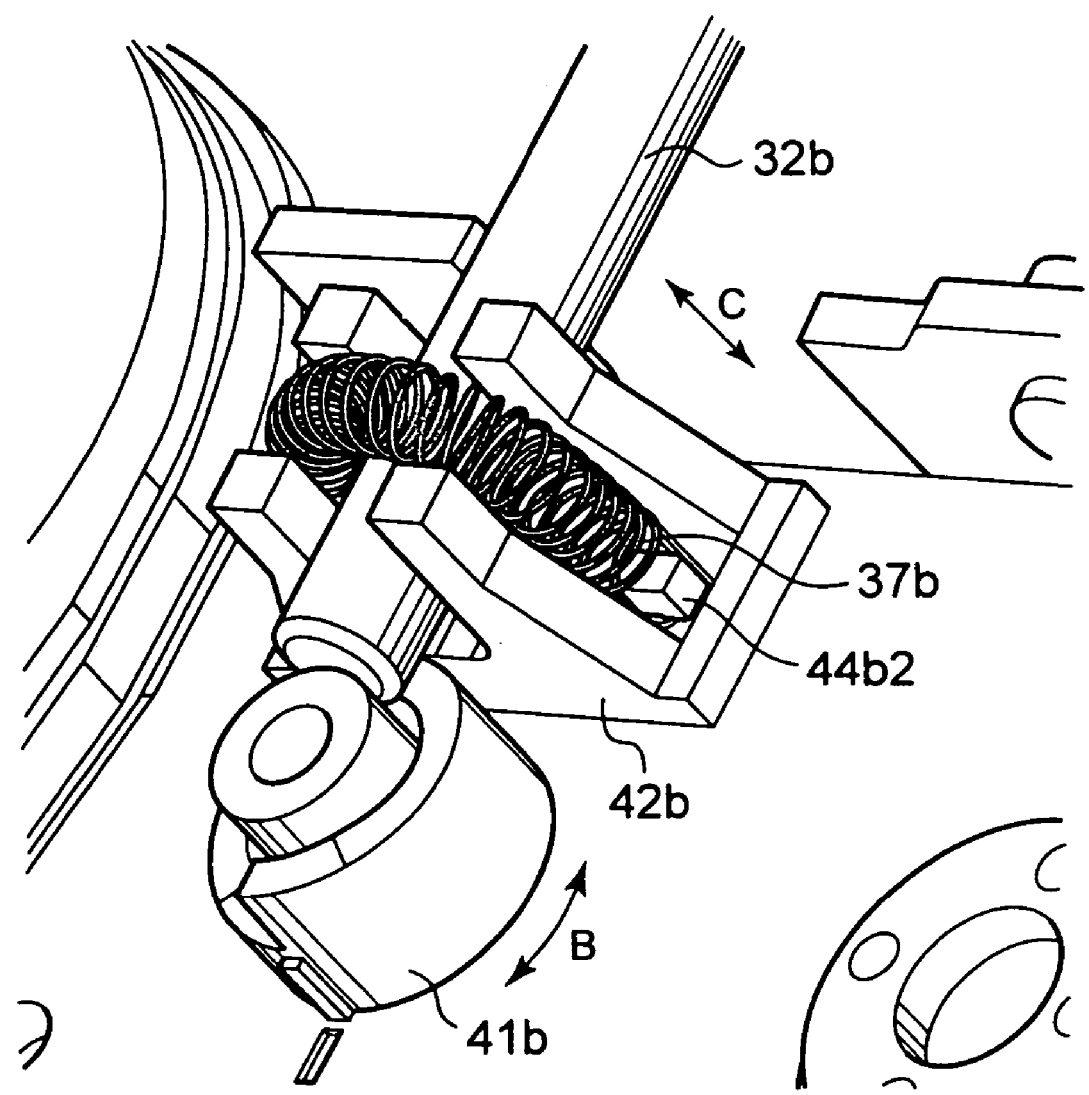
FIG. 4 is a view showing the fitting state of an extension spring in the embodiment in which the present invention is applied to the skew adjustment mechanism of an optical pick-up unit of an optical disk drive.
Figure 5:
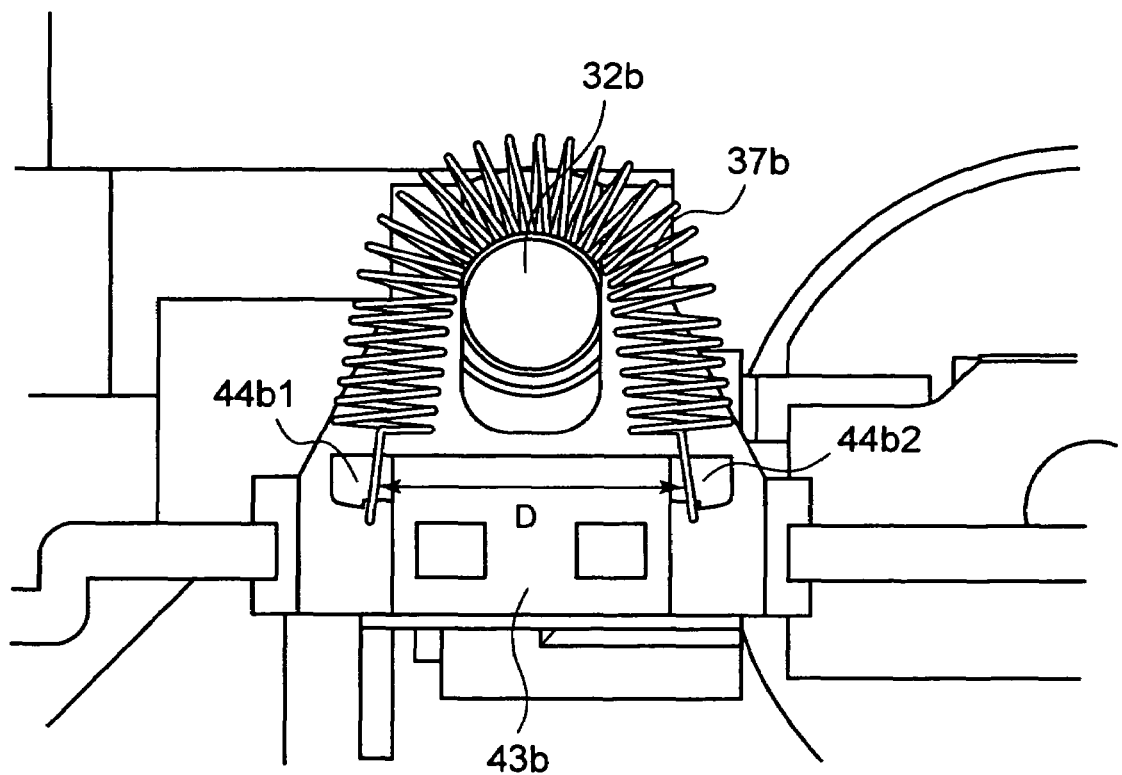
FIG. 5 is a cross-sectional view showing the fitting state of an extension spring in the embodiment in which the present invention is applied to the skew adjustment mechanism of an optical pick-up unit of an optical disk drive.

For example, the portion where one end portion of the guide shaft 32b is secured by the extension spring 37b is shown in FIG. 4 as an enlarged view, and a cross-sectional view thereof is shown in FIG. 5. The leading end of the guide shaft 32b is placed on an adjusting cam 41b, and end portion thereof is supported by a guide member 42b having a central concave portion. As shown in FIG. 5, the extension spring 37b has ring-shaped hook portions at both ends which are hooked over claw portions 44b1 and 44b2 of a fixing member 43*b*, and it is pressed against the guide member 42*b*. Therefore, a vertical load is always applied downward to the guide shaft 32, so that it is always pressed against the guide member 42*b*.

The adjusting cam 41*b* can be rotatably controlled by a motor provided on the reverse side of the pick-up traverse chassis 38 in the direction indicated by the arrow B. The adjustment of the rotation allows the height of the end portion of the guide shaft 32*b* to be changed in the direction indicated by the arrow C.

Referring back to FIG. 3, the same adjusting cams as the adjusting cam 41*b* are provided at the other end of the guide shaft 32*b* and both end portions of the guide shaft 32*a*, and the height of the end portions of the guide shafts 32*a* and 32*b* can be adjusted by the same mechanism as described above.

The skew adjustment mechanism of the optical pick-up unit having the above configuration operates in practice as follows. When an optical disk is set on the skew adjustment mechanism at the time of reproduction, the skew adjustment mechanism moves in the direction along the arrow A, emits upward a laser light toward the optical disk, and a signal obtained from the light reflected by the optical disk is reproduced. When the optical disk set on the mechanism is tilted, the above adjusting cam is rotated to automatically control the height of the end portion of the guide shaft. Therefore, the tilt of the optical pick-up unit is adjusted in a two-dimensional manner, that is, in the direction of the arrow A and the direction perpendicular to the arrow A.

Incidentally, the guide member 42*b* and the like are provided for caution's sake in the above embodiment. However, in a state where the guide shaft 32*b* is secured by the extension spring 37*b* as shown in FIG. 5, the movement of the guide shaft 32*b* is restricted not only in the vertical direction but also in the horizontal direction, with the result that the guide shaft is not off to the side. Therefore, the guide member 42*b* is not necessarily required.

In FIG. 5, when the interval D between the claw portions 44*b*1 and 44*b*2 provided on the fixing member 43*b* is set less than or equal to the width of the guide shaft 32*b*, the movement in the horizontal direction of the guide shaft is further restricted as compared to the case of the above embodiment, further reducing the necessity of the guide member 42*b*.

The shaft support mechanism according to the embodiment of the present invention, in which the extension springs are employed and disposed in such a manner to surround the respective shafts in a rounded manner, has the following advantages: Extra space for obtaining a spring tension can be eliminated; A secure attachment can be obtained since the spring is hooked from the upper side of the mechanism after disposition of the components; A load twice the spring tension can be obtained by using the spring whose both ends are secured; The number of the components can be reduced since the spring itself serves as a stopper for preventing the shaft from being slipped; Manufacturing cost can be reduced since the spring to be used is widely used and cheap.

Further, the end portions of the two guide shafts are secured by the extension springs, respectively, and the height of the shafts can be adjusted by the adjusting cams. Thus, the tilt of the optical pick-up unit can be adjusted in a two-dimensional manner.

In the above-described embodiment, the present invention has been applied to the skew adjustment mechanism of the optical pick-up unit of the optical disk drive. However, the present invention is not limited to this, and can be applied to a shaft support mechanism that supports a rod-shaped shaft in an optical disk drive in general.

What is claimed is:

1. A shaft support mechanism of an optical disk drive comprising:
   a rod-shaped shaft;
   a fixing member having a pair of claw portions that are provided at an interval, the interval between the claw portions formed on the fixing member is equal to or less than the width of the rod-shaped shaft;
   an extension spring having hook portions at both leading ends thereof, the hook portions are hooked on the pair of claw portions over the rod-shaped shaft, thereby pressing the rod-shaped shaft against the fixing member; and
   an adjustment mechanism that moves the end portion of the rod-shaped shaft pressed by the extension spring in a direction of height.

2. A skew adjustment mechanism of an optical disk drive comprising:
   an optical pick-up unit that irradiates an optical disk with a laser light and receives the laser light reflected by the optical disk;
   a pair of guide shafts that hold the optical pick-up unit therebetween and guide the optical pick-up unit in the extending direction of the guide shafts;
   fixing members disposed at respective end portions of the guide shafts and each having a pair of claw portions that are provided at an interval, the interval between the claw portion formed on the fixing member is equal to or less than the width of the guide shaft;
   extension springs each having hook portions at both leading ends thereof, the hook portions are hooked on the pair of claw portions over the guide shaft, thereby pressing the shaft against the fixing member; and
   adjustment mechanisms that move the guide shaft pressed by the extension spring in a direction of height in order to tilt the optical pick-up unit in accordance with the tilt of the optical disk.

3. A skew adjustment mechanism of an optical disk drive comprising:
   an optical pick-up unit that irradiates an optical disk with a laser light and receives the laser light reflected by the optical disk;
   a pair of guide shafts that hold the optical pick-up unit therebetween and guide the optical pick-up unit in the extending direction of the guide shafts;
   four fixing members disposed at respective end portions of the guide shafts and each having a pair of claw portions that are provided at an interval, the interval between the claw portions formed on the fixing member is equal to or less than the width of the guide shaft;
   four extension springs each having hook portions at both leading ends thereof, the hook portions are hooked on the pair of claw portions over the guide shaft, thereby pressing the end portions of the guide shaft against the fixing member; and
   four adjustment mechanisms that move the guide shafts pressed by the extension spring in a direction of height in order to tilt the optical pick-up unit in accordance with the tilt of the optical disk.

* * * * *